United States Patent
Hessert et al.

(10) Patent No.: US 7,510,004 B1
(45) Date of Patent: Mar. 31, 2009

(54) METHOD FOR TREATING AN UNDERGROUND FORMATION

(76) Inventors: James E. Hessert, 9703 E. 75th, #837, Tulsa, OK (US) 74133; D. Daniel Wallace, 2209 Boren Blvd., Seminole, OK (US) 74868; Jimmy D. DeLong, P.O. Box 434, Oklahoma City, OK (US) 74170; Charles J. Neef, 1938 Crawford, #40, Garland, TX (US) 75041

( * ) Notice: Subject to any disclaimer, the term of this patent is extended or adjusted under 35 U.S.C. 154(b) by 714 days.

(21) Appl. No.: 10/666,658

(22) Filed: Sep. 19, 2003
(Under 37 CFR 1.47)

Related U.S. Application Data (60) Division of application No. 08/969,680, filed on Nov. 13, 1997, now Pat. No. 6,667,279, which is a continuation-in-part of application No. 08/748,342, filed on Nov. 13, 1996, now abandoned.

(51) Int. Cl.
*E21B 33/13* (2006.01)
*E21B 37/00* (2006.01)

(52) U.S. Cl. .................... 166/281; 166/294; 166/301; 166/312

(58) Field of Classification Search .............. None
See application file for complete search history.

(56) References Cited

U.S. PATENT DOCUMENTS

| | | | | |
|---|---|---|---|---|
| 3,958,638 | A | * | 5/1976 | Johnston ............... 166/294 |
| 5,224,546 | A | * | 7/1993 | Smith et al. ............ 166/300 |
| 5,417,285 | A | * | 5/1995 | Van Buskirk et al. ..... 166/292 |
| 5,888,943 | A | * | 3/1999 | Diggs et al. ............ 507/100 |

* cited by examiner

*Primary Examiner*—Zakiya W. Bates
(74) *Attorney, Agent, or Firm*—Gary Peterson

(57) ABSTRACT

A swellable polymer gel composition for use in subterranean formations. The composition comprises water, a water soluble polymer, a water soluble crosslinking system and a swelling agent. The crosslinking system may be either a redox system or a chelating system. The amounts of the polymer and the crosslinking system are effective to form a substantially uniformly reacted tri-dimensional gel structure. To the gel solution, is added a swelling agent in an amount sufficient to increase the volume of the gel a predetermined percentage. The swelling agent may be a natural or a synthetic agent. A strengthening agent may be added to increase the gel strength of the composition. The composition has numerous uses and is particularly useful in oil industry applications such as plugging wells, sealing casing leaks and reducing water production from water-bearing hydrocarbon formations. The composition is economically produced, preserves the wellbore for future reentry in plugging operations, inhibits corrosion of casing by the hydration of water, inhibits the leaching of hazardous metal into the environment, and continuously expands in the presence of water.

11 Claims, 8 Drawing Sheets

Figure 17

METHOD FOR TREATING AN UNDERGROUND FORMATION

CROSS REFERENCE TO RELATED APPLICATION

This application is a division of U.S. patent application Ser. No. 08/969,680, filed Nov. 13, 1997, now U.S. Pat. No. 6,667,279, which is a continuation-in-part of U.S. patent application Ser. No. 08/748,342, entitled "METHOD AND COMPOSITION FOR FORMING WATER IMPERMEABLE BARRIER," filed Nov. 13, 1996 and now abandoned, the entire contents of which are incorporated herein by reference.

FIELD OF THE INVENTION

The present invention relates generally to polymer gel compositions and, more particularly, to swellable polymer gel compositions. The invention further relates to methods of using swellable polymer gel compositions in subterranean formations.

SUMMARY OF THE INVENTION

The present invention is directed to a swellable polymer gel composition for use with an aqueous solution. The composition comprises water, a water soluble polymer, a water soluble crosslinking system and a swelling agent. The amounts of the polymer and the crosslinking system are effective to form a substantially uniformly reacted gel structure. The amount of the swelling agent is calculated to maintain or increase the volume of the gel a predetermined percentage when the swelling agent contacts the aqueous solution.

The present invention is further directed to a swellable polymer gel composition for use with an aqueous solution. The composition comprises water, a water soluble polymer, a water soluble crosslinking system, a strengthening agent and a swelling agent.

The water comprises from about 75 percent to about 99 percent of the weight of the composition. The water soluble polymer comprises a mixture of polymers. The mixture of polymers comprises carboxymethylcellulose having from about a 0.65 degree of substitution to about a 0.95 degree of substitution and partially hydrolyzed polyacrylamide with a degree of hydrolysis ranging from about 10 to about 20 percent. The weight of each polymer in the mixture of polymers is from about 0.01 to about 0.35 percent of the weight of the composition and the polymers in the mixture of polymers are combined in about a 50/50 ratio.

The water soluble crosslinking system comprises a water soluble crosslinking agent and a water soluble reducing agent. The crosslinking agent is sodium dichromate, and the weight of the sodium dichromate is from about 0.2 to about 60 percent of the weight of the polymer. The reducing agent is sodium thiosulfate or ammonium thiosulfate, and the weight of the reducing agent is from about 150 to about 500 percent of the weight of the sodium dichromate.

The strengthening agent comprises a mixture of diatomaceous earth and barite. The weight of the strengthening agent is from about 0.01 to about 25 percent of the weight of the composition.

The swelling agent is selected from the group consisting of crosslinked sodium salt of polyacrylate, crosslinked acrylamide potassium copolymer, and crosslinked acrylamide sodium copolymer. The weight of the swelling agent is from about 0.3 to about 5 percent of the weight of the composition.

The present invention is further directed to a swellable polymer gel composition for use with an aqueous solution, the swellable polymer gel comprising water, a water soluble polymer, a water soluble crosslinking system, a strengthening agent and a swelling agent.

The water comprises from about 75 percent to about 87 percent of the weight of the composition. The water soluble polymer comprises a mixture of polymers. The mixture comprises carboxymethylcellulose having from about a 0.65 degree of substitution to about a 0.95 degree of substitution and partially hydrolyzed polyacrylamide having a degree of hydrolysis ranging from about a 10 to about a 20 percent. The weight of each polymer in the mixture of polymers is from about 0.01 to about 0.35 percent of the weight of the composition, and the polymers in the mixture of polymers are combined in about a 50/50 ratio.

The water soluble crosslinking system comprises a water soluble crosslinking agent and a chelating agent. The crosslinking agent is zirconium lactate comprising from about 0.75 to about 3 percent of the weight of the composition.

The strengthening agent comprises a mixture of diatomaceous earth and barite. The weight of the strengthening agent is from about 0.01 to about 25 percent of the weight of the composition.

The swelling agent is selected from the group consisting of crosslinked sodium salt of polyacrylate, crosslinked acrylamide potassium copolymer, and crosslinked acrylamide sodium copolymer. The weight of the swelling agent is from about 0.3 to about 5 percent of the weight of the composition.

The present invention is further directed to a swellable polymer gel composition for use with an aqueous solution. The composition comprises water, a water soluble polymer, a water soluble crosslinking system, a strengthening agent and a swelling agent.

The water comprises from about 75 percent to about 99 percent of the weight of the composition. The water soluble polymer comprises a mixture of polymers. The mixture of polymers comprises carboxymethylcellulose having from about a 0.65 degree of substitution to about a 0.95 degree of substitution and partially hydrolyzed polyacrylamide with a degree of hydrolysis ranging from about 10 to about 20 percent. The weight of each polymer in the mixture of polymers is from about 0.08 to about 1 percent of the weight of the composition and the polymers in the mixture of polymers are combined in a ratio of about 70 percent carboxymethylcellulose to about 30 percent partially hydrolyzed polyacrylamide.

The water soluble crosslinking system comprises a water soluble crosslinking agent and a water soluble reducing agent. The crosslinking agent is sodium dichromate, and the weight of the sodium dichromate is from about 0.2 to about 60 percent of the weight of the polymer. The reducing agent is sodium thiosulfate or ammonium thiosulfate, and the weight of the reducing agent is from about 150 to about 500 percent of the weight of the sodium dichromate.

The strengthening agent comprises a mixture of diatomaceous earth and barite. The weight of the strengthening agent is from about 0.01 to about 25 percent of the weight of the composition.

The swelling agent is selected from the group consisting of crosslinked sodium salt of polyacrylate, crosslinked acrylamide potassium copolymer, and crosslinked acrylamide sodium copolymer. The weight of the swelling agent is from about 0.3 to about 5 percent of the weight of the composition.

The present invention is further directed to a swellable polymer gel composition for use with an aqueous solution, the swellable polymer gel comprising water, a water soluble polymer, a water soluble crosslinking system, a strengthening agent and a swelling agent.

The water comprises from about 75 percent to about 87 percent of the weight of the composition. The water soluble polymer comprises a mixture of polymers. The mixture comprises carboxymethylcellulose having from about a 0.65 degree of substitution to about a 0.95 degree of substitution and partially hydrolyzed polyacrylamide having from about a 10 to about a 20 percent degree of hydrolysis. The weight of each polymer in the mixture of polymers is from about from about 0.08 to about 1 percent of the weight of the composition, and the polymers in the mixture of polymers are combined in a ratio of about 70 percent carboxymethylcellulose to about 30 percent partially hydrolyzed polyacrylamide.

The water soluble crosslinking system comprises a water soluble crosslinking agent and a chelating agent. The crosslinking agent is zirconium lactate comprising from about 0.75 to about 3 percent of the weight of the composition.

The strengthening agent comprises a mixture of diatomaceous earth and barite. The weight of the strengthening agent is from about 0.01 to about 25 percent of the weight of the composition.

The swelling agent is selected from the group consisting of crosslinked sodium salt of polyacrylate, crosslinked acrylamide potassium copolymer; and crosslinked acrylamide sodium copolymer. The weight of the swelling agent is from about 0.3 to about 5 percent of the weight of the composition.

Still further, the present invention is directed to a method for treating a subterranean formation. The method comprises the step of introducing a swellable composition into the formation in the area requiring treatment. The swellable composition comprises a water soluble polymer, a water soluble crosslinking system, and a swelling agent. The amounts of the polymer and the crosslinking system are effective to form a substantially uniformly reacted gel structure. The amount of the swelling agent is calculated to increase the volume of the gel a predetermined percentage when the swelling agent contacts the aqueous solution.

The present invention is further directed to a method for removably plugging an oil and gas well which is to be abandoned. The method comprises the step of plugging the wellbore with a composition, wherein the composition is removable from the wellbore by circulating a fluid through the wellbore.

Finally, the present invention is directed to a method for restoring to service an abandoned oil and gas well plugged with a composition removable from the wellbore. The method comprises the step of removing the composition from the wellbore by circulating a fluid through the wellbore.

BRIEF DESCRIPTION OF THE DRAWINGS

FIG. 8 is a cross sectional view of a subterranean formation and shows isolation of the casing leak with a bridge plug.

FIG. 16 is a cross sectional view of a subterranean formation and shows use of the composition of the present invention to reduce the production of water from a water bearing zone in the formation.

DETAILED DESCRIPTION OF THE PREFERRED EMBODIMENTS

Oil and gas wells which no longer produce hydrocarbons in commercial quantities are often abandoned when the well is not profitable to operate. Most states have legislated requirements for compliance with regulatory controls when abandoning a well. These regulatory controls serve to protect treatable water bearing formations from contaminants migrating from nearby strata and, typically, require that abandoned wells be plugged.

With conventional plugging methods, cement is used to seal off oil, gas and water bearing zones. Generally, the zone must be isolated by filling the annulus with cement to a predetermined distance above and below the casing perforations leading to the zone. In some instances, the wellbore is completely filled with cement. Nevertheless, after a well has been plugged with cement, it is almost always too costly to reenter the well and resume production.

Wells plugged using conventional methods usually require removal of cement plugs by drilling. Reentry in wells with cement plugs is an expensive operation burdened by the costs of drilling, including permits, drilling material and equipment, labor and other concomitant costs. Unfortunately, the costs of reentering a well plugged with cement are usually so prohibitive in relation to the expectation of profit to be made on the recoverable reserves remaining in the reservoir that in most instances, the costs are not worth the potential benefit. Hence, conventional cement plugs ring the death knell for oil and gas wells.

Nonconcrete plugging materials, such as weighted drilling mud slurries and high viscosity fluids, have been developed to address the problems created by the use of conventional concrete plugs. These materials, while effective in permitting reentry of the well, lack strength. Once dissolved in the wellbore, these plugging replacements are susceptible to dissolution in the presence of water, leading to disintegration of the material.

The present invention comprises a polymer gel composition which may be used in place of cement in well plugging operations. The composition is a swellable, water impermeable, polymer gel characterized by the ability to hydrate, and thus expand to fill and plug the wellbore. The composition forms a water impermeable barrier which stops the migration of fluids through the wellbore into treatable water bearing formations.

Moreover, the composition continues to swell as more water seeps into the formation, sealing new leaks and producing a tighter, more efficient seal. This inhibits corrosion of the metal casing. Additives which inhibit leaching of hazardous material into the environment may also be mixed in the composition. Thus, the composition provides an environmentally safer alternative to existing plugging compositions.

Importantly, the wellbore is preserved for future reentry in the event that economic conditions justify production of the well. The composition may be conveniently and easily removed simply by circulating a fluid through the wellbore to flush or rinse the gelled composition out of the wellbore. This permits stripper wells which have been plugged to be reentered and restored to service. Hence, the invention provides a permanent well plugging composition while preserving the life of the well for future production.

The swellable polymer gel composition is less expensive than most conventional cement plugging materials and is made from readily available components. The composition of the present invention has the added feature of versatility in oil and gas industry applications. Not only is the composition useful in well plugging operations, it is useful in other applications, such as in reducing water production and in sealing casing leaks.

Wells producing a high percentage of water may be treated with the composition to reduce water production. Because water usually is not a marketable product, the operator must dispose of the water through reinjection wells or by transporting the water to a disposal location. Water production adds operational costs and decreases the profitability of the well. The composition can be used to seal the water bearing formation in the well, and thus reduce the amount of water produced. The composition has the capability to significantly increase the ratio of oil to water produced and, accordingly, increase the profitability of the well.

Another advantage of the invention is use of the composition to seal casing leaks and perform mechanical integrity tests. Occasionally, wells are shut in and tested to determine if pressure is maintained. A well which does not maintain pressure over a suitable period of time is determined to have a leak. The composition may be used to seal the leak and restore the well to operational status.

In each of these applications, the invention provides an economical, readily available well treating composition capable of protecting the environment while maintaining the life of the well for future production. The swelling agent has the capacity to absorb excess chromium and thereby reduce the amount of chromium released into the environment. These and other advantages of the present invention will be apparent from the following description of the preferred embodiments.

The swellable polymer gel composition of the present invention comprises water, a water soluble polymer, a water soluble crosslinking system and a swelling agent. The polymer and the crosslinking system dissolve in the water to produce a substantially uniformly reacted gel structure. The crosslinking system reacts with the polymer to form a tridimensional gel structure. The presence of the swelling agent gives the composition the ability to hydrate, thus swell and take up more space. This makes the composition more economical to use in that it takes less of the composition to meet the requirements of a particular application.

The composition is made by raising the viscosity of water with an effective amount of a water soluble polymer. The water preferably comprises from about 75 percent to about 99 percent of the total weight of the composition. For a purpose yet to be described, it is preferred that the water contain not more than 5 percent by weight of metal salts.

The polymers which may be employed to form the swellable gel composition are water soluble or dispersible in water. Water solubility gives a uniform distribution of the aqueous polymer solution for a purpose which is yet to be described. Preferably, the polymers used in the practice of the invention are substantially linear, meaning that these polymers are substantially free of cross linking between the polymer chains.

As used herein, the term "polymer" includes homopolymers and copolymers and may be selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of pyrrolidone, acrylamide and sodium 2-acrylamido-2-methylpropane sulfonate, copolymers of acrylamide and sodium 2-acrylamido-2-methylpropane sulfonate, water soluble cellulose ether, and derivatives and mixtures thereof. In one preferred embodiment of the invention, a mixture of water-soluble cellulose ethers are used to produce a gel having the desired properties. Some suitable water-soluble cellulose ethers include hydroxyalkyl celluloses, alkyl celluloses, alkylhydroxyalkyl celluloses, alkylcarboxyalkyl celluloses, alkyalkyl celluloses, hydroxyalkylalkyl celluloses, mixed ethers such as carboxyalkyl hydroxyalkyl ethers, and carboxyalkyl cellulose ethers, such as carboxymethylcellulose. The particular polymer selected will depend upon the desired characteristics of the subsequently formed gel.

A preferred polymer comprises a mixture of two polymers, namely carboxymethylcellulose, having from about a 0.65 to about a 0.95 degree of substitution, and partially hydrolyzed polyacrylamide, having a 10 to 20 percent degree of hydrolysis. This mixture gives the desired physical properties of elasticity and resistance to shearing forces and also reduces brittleness. The components of the mixture, when used alone to form a gel, produce a polymer gel that is either rigid but brittle or elastic but structurally weak. The combination of carboxymethylcellulose and partially hydrolyzed polyacrylamide in essentially even quantities produces a material having the desired properties of strength and elasticity.

It will be appreciated that the number and ratio of the polymers in the mix may be varied according to the desired properties of the resulting gel. In one preferred embodiment of the invention, the polymers in the mixture preferably are combined in a 50/50 ratio (the "50/50 polymer mix"). In another preferred embodiment, the polymers are combined in a ratio of about 70 percent carboxymethylcellulose to about 30 percent partially hydrolyzed polyacrylamide (the "70/30 polymer mix" It will be appreciated that a single polymer, an 80/20 polymer mix, or a mix of three or more polymers in various ratios or percentages, may provide the appropriate properties, such as gel strength, adhesion characteristics and swelling capability, for the relevant application.

The effective amount of the polymer added to the water will generally range from about 0.0025 percent to about 5 percent of the weight of the total composition. The actual amount used depends upon the molecular weight of the selected polymer, the desired viscosity of the composition, which in turn depends upon the use for which the composition is intended, and also upon economics.

One preferred concentration of the polymer mixture of carboxymethylcellulose and partially hydrolyzed polyacrylamide is about 0.35 percent of the weight of the total composition for each polymer component. Although the invention may be practiced using either polymer in a concentration ranging from about 0.25 percent to about 1 percent by weight, the amount of the preferred mixture ranges in weight from about 0.25 to about 1.0 percent, with the preferred amount being about 0.35 percent of each component.

In another preferred embodiment, the polymer mix is comprised of 70 percent carboxymethylcellulose and 30 percent partially hydrolyzed poylacrylamide. This polymer mix increases the gel strength, which may be desirable in certain high pressure field applications, and improves adhesion to the borewall in oil field applications. Although the invention may be practiced using either polymer in a concentration ranging from about 0.08 to about 1 percent by weight, the amount of the preferred mixture ranges from about 0.29 to about 0.69 percent of the weight of the composition, wherein the carboxymethylcellulose comprises 70 percent of the weight of the 70/30 polymer mix and the partially hydrolyzed polyacrylamide comprises about 30 percent of the polymer mix weight.

The crosslinking system comprises a redox system having a water soluble crosslinking agent and a water soluble reducing agent. The crosslinking agent comprises a compound of a polyvalent metal reactive with the reducing agent. The valence state of at least a portion of the metal is capable of being placed by the reducing agent in a valence state reactive with the polymer. The crosslinking system reacts with the polymer to form a tri-dimensional gel structure.

The amounts of the crosslinking system and the polymer are effective to form a substantially uniformly reacted gel structure. It will now be appreciated that if the aqueous polymer solution is too dilute, the crosslinking system will not react, or the solution may achieve a gelatinous state but a gel will not form. Consequently, it is important that the amount of crosslinking system be sufficient to achieve a substantially uniformly reacted gel structure. This means that at least most of the polymer and crosslinker must have reacted, leaving substantially no unreacted polymer and crosslinker.

The exact amount of crosslinking agent added will depend upon the choice of additives used to make the swellable polymer gel composition. However, in most cases, the amount of the crosslinking agent will range from about 0.05 to about 60 weight percent of the polymer.

The crosslinking agent is selected from the group consisting of ammonium chromate, ammonium dichromate, the alkali metal chromates and dichromates, and derivatives and mixtures thereof. All of these agents have in common that the valence state must be reduced to a lower valence state reactive with the reducing agent in order to crosslink with the polymer and form a tri-dimensional gel structure. One preferred crosslinking agent for use with the preferred polymer is sodium dichromate in an amount ranging from about 0.2 to about 60 percent of the weight of the polymer.

The reducing agent reduces the valence state of the crosslinking agent so that it may react with the polymer gel to form a tri-dimensional gel structure. The reducing agent may be selected from the croup consisting of thiourea, hydroquinone, sodium sulfide, sodium hydrosulfite, sodium metabisulfite, potassium sulfite, sodium bisulfite, potassium metabisulfite, sodium sulfite, sodium thiosulfate, ammonium thiosulfate, potassium thiosulfate, potassium metabisulfate, ferrous sulfate, ferrous chloride, p-hydrazinobenzoic acid, hydrazine phosphite, hydrazine dihydrochloride, thioacetamide, and derivatives and mixtures thereof.

The amount of the reducing agent generally ranges from about 0.1 to about 300 percent of the stoichiometric amount of the reducing agent required to reduce the crosslinking agent to a reactive polyvalent metal state. It will now be appreciated that the polyvalent metal ions are employed in the form of compounds or complexes with an effective reducing agent capable of reducing the polyvalent metal state to a lower polyvalent metal state, thus permitting reaction with the polymer and forming a stable, semi-solid crosslinked gel. Thus, the amount of reducing agent must be sufficient to reduce enough polyvalent metal ions to a valence state reactive with the polymer.

It now will be appreciated that the water contain not more than 5 percent metal salts to prevent interference of the metal salts with the crosslinking process. A high percentage of metal salts could potentially decrease the amount of crosslinking and, ultimately, the gel strength of the composition. It further will be appreciated now that the solubility characteristics of the polymer used in the practice of the invention achieves an essentially even distribution of the polymer, which achieves a stronger tri-dimensional crosslinked gel.

The amount of the reducing agent added may serve as a timing device. Should a rapid formation of gel be desired, a larger amount of reducing agent will be added. The more reducing agent added, the quicker the polyvalent metal ions will be reduced to a lower polyvalent state reactive with the polymer. The preferred reducing agent of the redox crosslinking system is either sodium thiosulfate or ammonium thiosulfate in an amount comprising 150 to 500 percent of the weight of the preferred crosslinking agent, sodium dichromate, to permit the polymer and the crosslinking system to react in direct proportion.

The invention further comprises a swelling agent. The type of the swelling agent added depends upon the amount of the swelling desired in the particular application in which the invention is used. The swelling agent is added in an amount sufficient to maintain or increase the volume of the gel a predetermined percentage when the swelling agent contacts the aqueous solution. The swelling agent generally causes the composition to increase in volume; however, in a closed system, such as a properly sealed wellbore, the volume of the gel cannot increase thus producing a denser, stronger, gelled composition.

The swelling agent may be a naturally occurring additive, such as chitosan, pectin, gelatin, amylopectin, k-carrageeman, hyaluronic acid, sulphobetaine, cellulose ethers, starch, and derivatives and mixtures thereof. Alternatively, the swelling agent may be a synthetic material, such as poly(ethylene oxide), poly(vinyl alcohol), poly(acrylic acid), poly(acrylamide), poly(acrylonitrile), poly(N-vinyl pyrrolidone), poly (2-hydroxyethylmethacrylate), poly(N-alkylacrylamide), poly(N,N-dialkylacrylamide), poly(mono-N-alkylitconates), poly(gamma-glutamic acid), poly(L-glutamic acid), gel blends of each of the foregoing, copolymers with corresponding monomers, and derivatives and mixtures thereof. The swelling agent is characterized by the ability to hydrate. Thus, the swelling agent absorbs water causing the polymer gel composition to expand in volume, or maintain volume, thus creating a water-impermeable barrier.

The swelling of the gel composition may take place immediately, or it may be delayed to occur over a period of several weeks. In order to delay the onset and rate of hydration, the swelling agent may be at least partially or completely encapsulated in a swelling material. Encapsulation serves to delay the onset and rate of hydration of the swelling agent. The encapsulation material dissolves in the polymer gel solution. In most applications, it is not desirable to achieve immediate swelling of the gel composition. The swelling agent, therefore, preferably is at least partially encapsulated to delay hydration.

The swelling agent may encapsulated using conventional encapsulation techniques, such as spray drying or extrusion. With spray drying, the encapsulation, or wall, material is hydrated then mixed with the swelling agent. A typical mixture ratio is 1 to 4, encapsulation material to swelling agent. The mixture of encapsulant and wall material is fed into a spray dryer where it is atomized and hot air is used to dehydrate the mixture. The dried material falls to the bottom of the dryer and is collected.

With extrusion techniques, the encapsulation of material by extrusion involves the dispersion of the encapsulant into a molten mass of the wall material. The mixture of encapsulant and wall material is forced through a die into a dehydrating solvent, such as isopropanol. The hardened strands are separated, broken and dried to give the encapsulated material. Other encapsulation techniques, such as phase separation encapsulation, emulsion encapsulation and fluid bed encapsulation may be utilized as well.

The common methods for the controlled release of encapsulants rely on temperature or moisture release processes. Other release processes include pH control, addition of surfactants, grinding, and photo-release. The technique chosen will depend upon the release process desired for a particular swelling agent.

Several suitable encapsulation materials include synthetic polymers taken from the group consisting of glycolide, poly (acrylate)s, poly(alkyl α-cyanoacrylate) and poly(acrylamide), and natural polymers taken from the group consisting of starch derivatives, cellulose derivatives, polysaccharrides, chitosan, gelatin and carrageenans. Laboratory tests with encapsulated swelling agents have shown that encapsulation significantly delays the rate of hydration of the swelling agent.

Moreover, the swelling agent has the capability to inhibit leaching of metal ions into the environment. Due to the presence of chromium and other toxins in the cross-linking system, the potential exists that the gelled composition may release toxins to the environment. The swelling agent of the present invention is further characterized by the ability to inhibit leaching of chromium and other heavy metals. The swelling agent typically is only partially crosslinked and provides chemical sites which absorb free toxins, thus preventing migration of these toxins into the water table and surrounding strata.

Preferably, a strengthening agent is added to the mixture in an amount effective to increase the gel strength of the composition. The "gel strength" as used herein means the ability of the composition to resist extrusion. The strengthening agent may be selected from the group consisting of diatomaceous earth, agar, arabic gums, clays, silica flour, natural fibers, synthetic fibers, cotton seed hulls, and derivatives and mixtures thereof. A preferred strengthening agent is diatomaceous earth in an amount ranging from about 0.01 to about 25 percent of the weight of the composition.

In an another preferred embodiment, the swellable polymer gel composition comprises water, a crosslinking system comprising a chelating agent and a crosslinking agent, and a swelling agent. The crosslinking agent of the crosslinking system is a water soluble compound of a polyvalent metal in an amount sufficient to form a tri-dimensional gel structure with the polymer. The chelating agent retards the onset and rate of gelation of the polymer and the crosslinking agent. The crosslinking agent is selected from the group consisting of iron (III), aluminum (III), titanium (IV), tin (IV), chromium (III), zirconium (IV), the metal cations of the first transition metal series, and derivatives and mixtures thereof. The chelating agent is taken from the group consisting of acetate, nitrilotriacetate, tartrate, lactates, citrate, triphenylphosphite, metaphosphite, gluconate, phosphate, and mixtures and derivatives thereof.

In preparing the chelating crosslinking system, a solution of polyvalent metal ions is prepared from a suitable water soluble salt of compound of the metal, such as chloride, nitrate, acetate, or the like, by admixing the metal salt compound with sufficient amounts of water to make a desired or convenient stock concentration. Fresh water is preferred for best solubility characteristics.

The chelating agent preferably is supplied or made available as a sodium salt, or in some cases, as a free acid. A stock solution is made up with water, preferably fresh water, to a convenient concentration, such as from about 1 to about 5 percent of chelating agent. Mixing the polyvalent metal with the chelating agent results in a metal in a reactive oxidation state protected by a chelating group. This crosslinking system delays the onset and rate of gelation.

Figure 1:
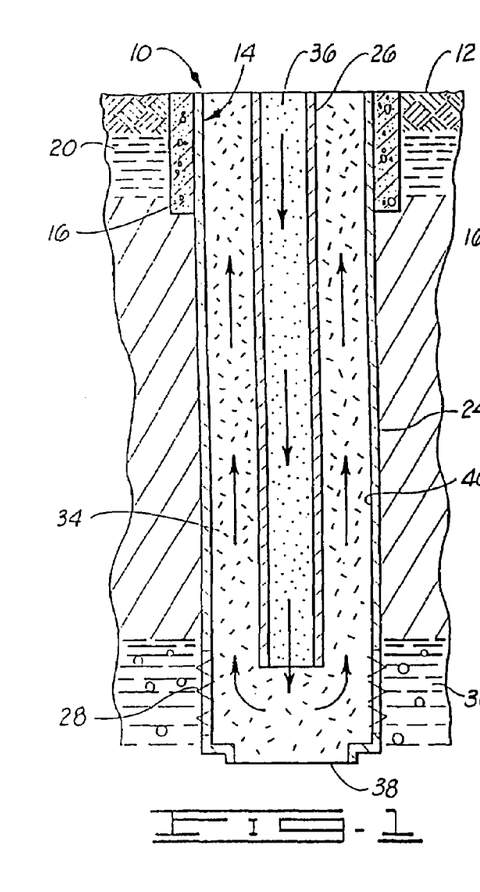
FIG. 1 is a cross sectional view of a subterranean formation and shows use of the composition of the present invention to flush the wellbore during a well plugging operation.
Figure 2:
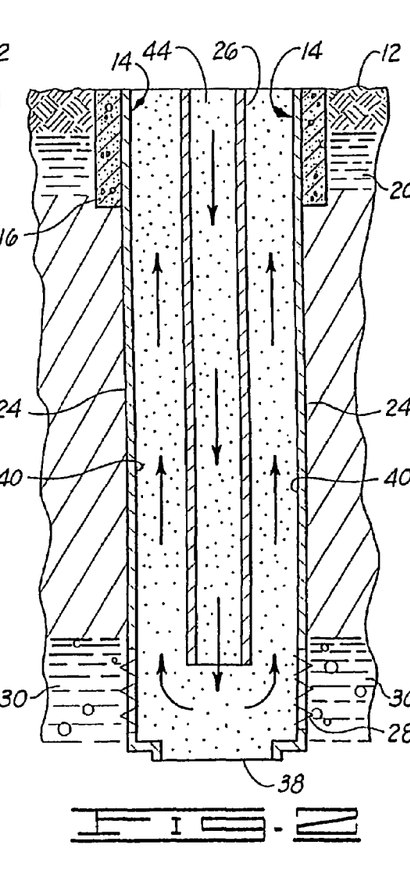
FIG. 2 is a cross sectional view of a subterranean formation and shows use of the composition to fill the wellbore during a well plugging operation.
Figure 3:
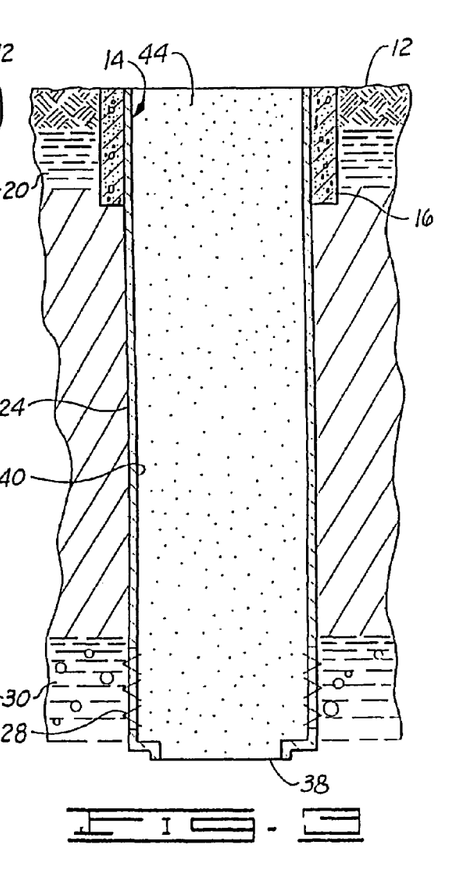
FIG. 3 shows a cross sectional view of an abandoned well plugged with the composition of the present invention.

Turning now to the drawings in general, and in particular to FIGS. 1 through 3, there is demonstrated therein the use of the invention to plug and abandon an oil and gas well. FIGS. 1 through 3 illustrate a subterranean formation 10, or a well, formed in the surface 12 of the earth. The formation 10 comprises a wellbore 14 which has been completed with surface casing 16 to the depth of the treatable water zone 20, production casing 24 completed to the total depth of the wellbore, and tubing 26. Perforations 28 through the production casing 24 to the producing zone 30 permit the recovery of hydrocarbons.

Although plugging operations vary widely depending upon the conditions at the well site and other factors, the following method describes one preferable use of the composition to plug and abandon an oil and gas well. As depicted in FIG. 1, existing fluids 34, such as oil, gas, condensate and drilling mud, must be circulated out of the well 10. The circulating fluid is introduced into the wellbore 14 through the tubing 26. circulates downhole 38, and up through the annular space 40 to a disposal site at the surface 12. The swellable polymer gel composition may be used to circulate the existing fluids 34 from the wellbore 14.

After the wellbore 14 is cleaned, the swellable polymer gel composition 44 is ready to be introduced into the wellbore. In most instances, the composition will be premixed and transported to the well site. However, in certain circumstances, for instance where immediate gelling of the composition is desirable, the composition may be mixed at the well site. In addition, certain elements of the composition, such as the strengthening agent and the swelling agent, may be premixed and transported to the site for mixing with the water, the polymer and the other agents.

Preferably before the composition 44 has begun to gel or swell, the composition 44 is introduced into the wellbore 14 through the tubing 26 in an amount sufficient to fill the wellbore 14, as shown in FIG. 2. The tubing 26 and any other equipment, such as packers, are removed from the wellbore 14, as illustrated in FIG. 3. The wellbore is closed to permit gelation and swelling of the composition. The composition 44 seals the perforations 28 and prevents the migration of hydrocarbons form the producing zone 30 to the treatable water zone 20.

Thus, the composition 44 replaces concrete as the plugging material used in conventional plugging operations. However, the composition 44 provides an advantage in that, should the well be reentered for the purpose of production, the resultant plug may be removed from the well 10 by circulating the composition out of the wellbore 14. Simply by circulating water, drilling mud, oil or other fluid through the wellbore 15, the gelled composition 44 may be "rinsed" from the wellbore 14 economically and conveniently. A rinsing fluid treated with an oxidizing agent may aid in the removal process. The oxidizing agent breaks down the polymer gel making it easier to rinse the wellbore 14 clean of the composition 44. The composition 44 adheres to the wellbore 14 until it is physically removed and the well 10 is restored to service.

The advantages over the existing technology are that the composition is economical and is made with readily available elements. The composition preserves the wellbore for future reentry, provides a stronger more effective seal, and prevents corrosion of the casing. The swelling additive has the capability to continuously seal any leaks by expanding in the presence of aqueous solutions. The composition is environmentally safer than existing technology and selected additives will inhibit leaching of hazardous metals into the environment. Moreover, the composition is viscous, stable, semi-solid, has high gel strength and stability giving it the ability to outperform conventional plugging materials.

Figure 4:
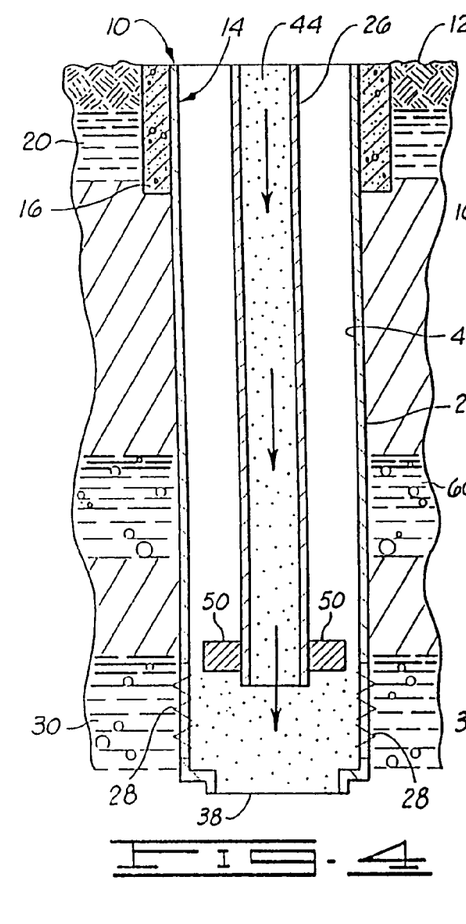
FIG. 4 is a cross sectional view of a subterranean formation and shows introduction of the composition of the present invention in a wellbore to abandon a single zone in a well.
Figure 5:
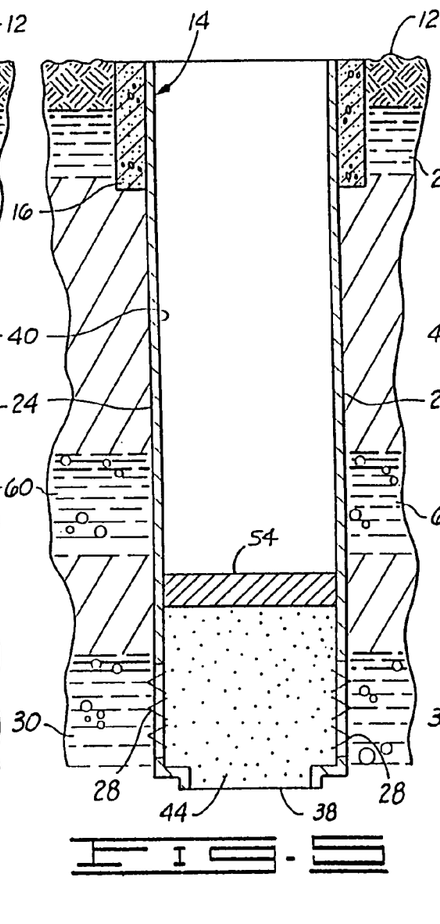
FIG. 5 is a cross sectional view of a subterranean formation and shows isolation of the composition of the present invention to permit gelation and swelling in the area of the abandoned zone.
Figure 6:
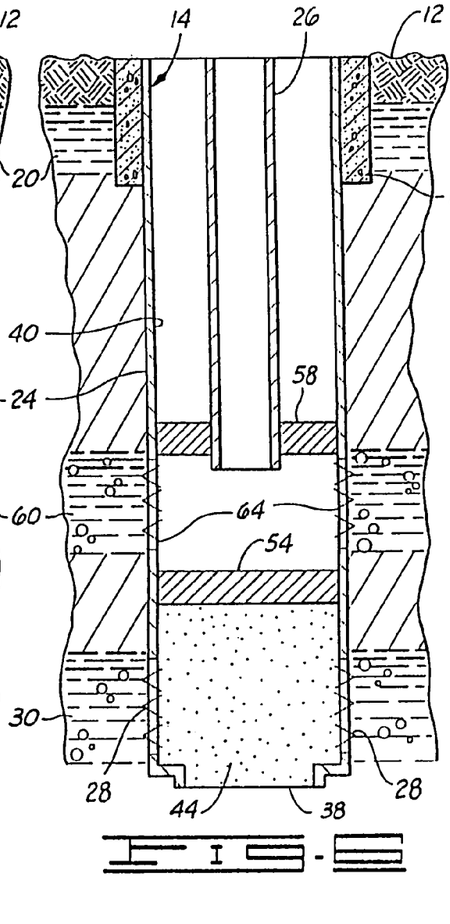
FIG. 6 is a cross sectional view of a subterranean formation and shows restoration of the well to service after using the composition of the present invention to plug the abandoned zone.

Turning now to FIGS. 4 through 6, use of the composition to plug and abandon the zone 30 in the wellbore 14 is illustrated. In FIG. 4, packer 50 is unseated to permit circulation of existing fluids out of the wellbore 14. The composition 44 is introduced into the wellbore 14 in the area of the zone 30 to be abandoned. The composition 44 should be pumped across the perforations and filled to a predetermined depth above the tubing 26 and perforations and as illustrated in FIG. 5. The tubing 26 and packer 50 are removed, and a bridge plug 54 is placed above the composition to seal the zone 30. The remaining composition 44 above the bridge plug 54 is circulated out of the wellbore 14. The composition 44 then is allowed to gel and swell. New tubing 56 is installed and zone 60 is perforated to restore the well to service, as shown in FIG. 6. The method provides all of the advantages of the method for plugging and abandoning a well while preserving the lower plugged zone 30 for reentry at a later time.

Figure 7:
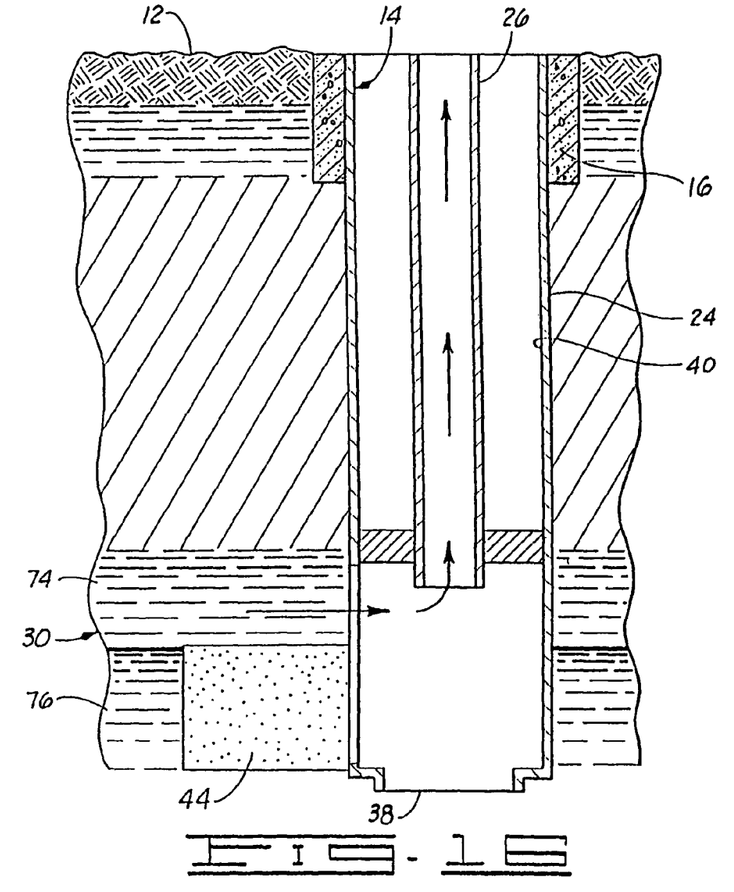
FIG. 7 is cross sectional view of a subterranean formation and shows the location of a casing leak in the well.
Figure 9:
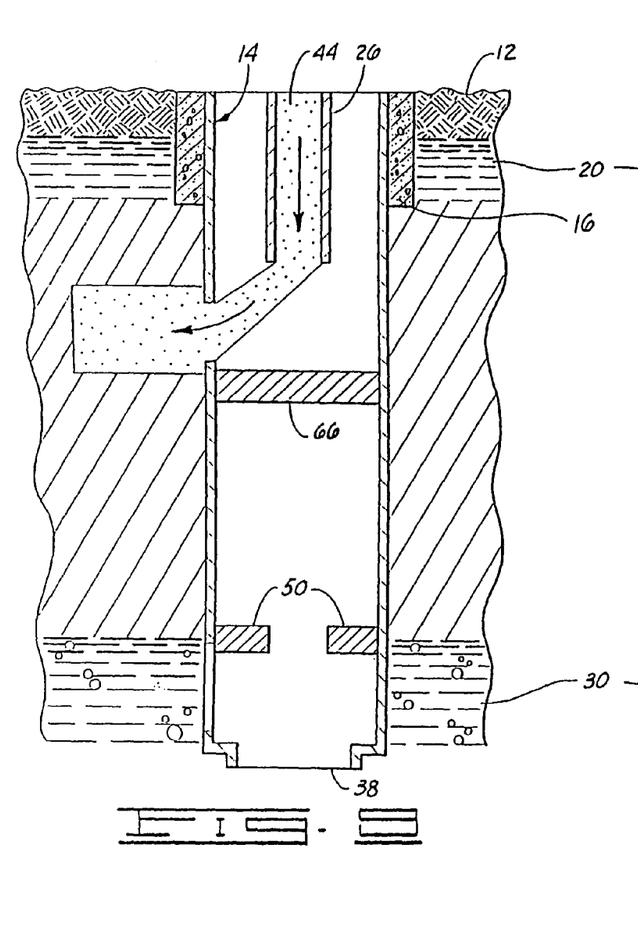
FIG. 9 is a cross sectional view of a subterranean formation and shows introduction of the composition of the present invention into the area of the casing leak.
Figure 10:
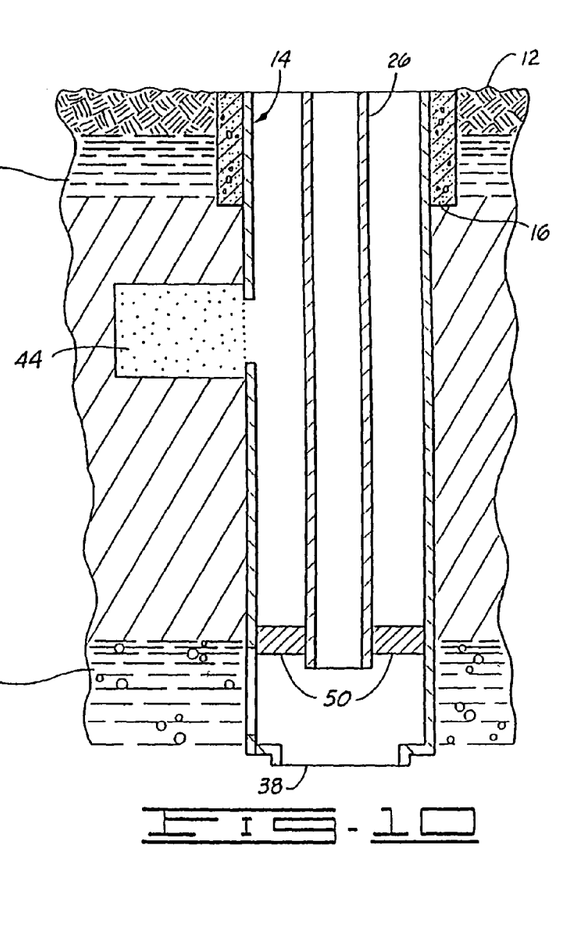
FIG. 10 is a cross sectional view of a subterranean formation and shows restoration of the well to service after having sealed the casing leak with the composition of the present invention.

Turning now to FIGS. 7 through 10, the use of the composition 44 to seal casing leaks will be illustrated. FIGS. 7 and 8 show a leak 64 in the production casing 24. The leak 64 must be located and isolated with a temporary plug 66. FIG. 8 shows that the composition 44 is introduced into the wellbore 14 through the tubing 26 in the area of the casing leak 64. The remaining composition 44 is flushed from the wellbore 14. The composition in the area of the leak 64 is allowed to gel and swell, after which time, the well 10 is restored to service.

The swelling capability of the composition 44 gives it the ability to provide a more durable seal. In addition, the agents may be added which make this composition more environmentally safe than other sealing compositions, because leaching of the polyvalent metal ions of crosslinkers is retarded.

Figure 11:
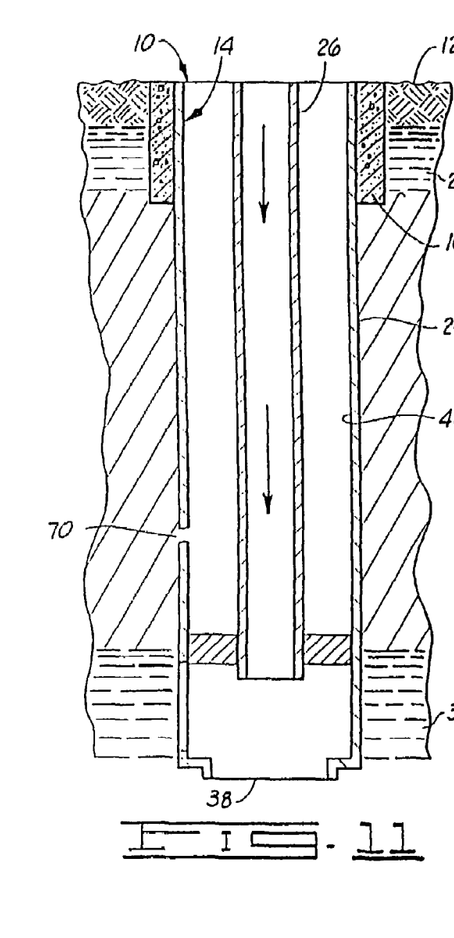
FIG. 11 is a cross sectional view of a subterranean formation and shows use of the composition of the present invention to perform a mechanical integrity test.
Figure 12:
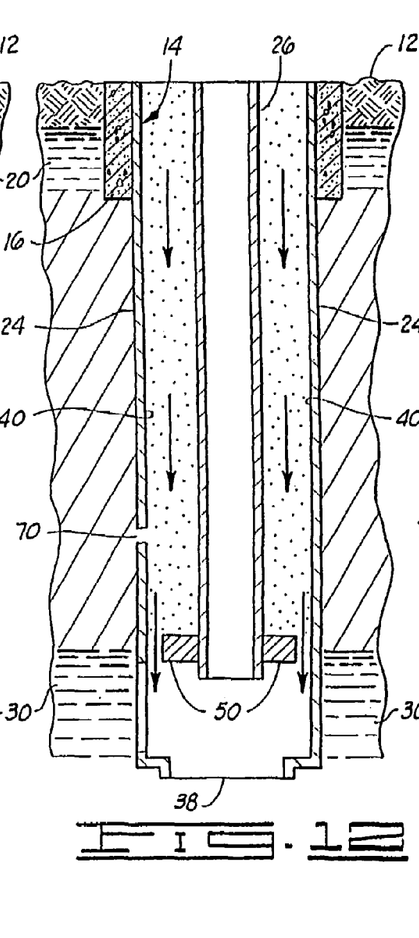
FIG. 12 is a cross sectional view of a subterranean formation and shows injection of the composition of the present invention into the annular space to seal a casing leak as part of a mechanical integrity test.
Figure 13:
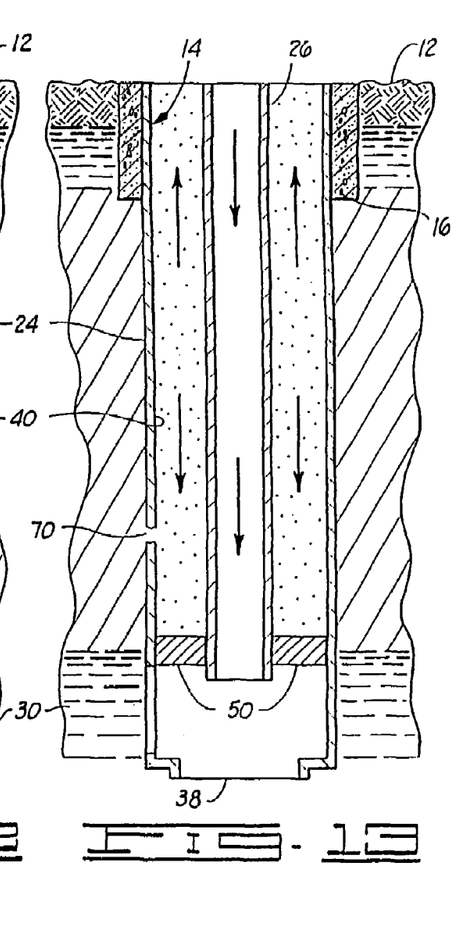
FIG. 13 is a cross sectional view of a subterranean formation and shows a well restored to service after completing a mechanical integrity test using the composition of the present invention.

Turning now to FIGS. 11 through 13, use of the composition to repair an oil or gas well which has failed a mechanical integrity test ("MIT") is illustrated. MIT's are performed on wells to determine the presence of a leak 70 in the production casing 24. The well 10 is pressurized to determine the well's ability to hold pressure. Failure to hold pressure over a designated period of time indicates the presence of a leak 70 in the production casing 24. A well which fails an MIT must be repaired before it can be restored to service.

As shown in FIG. 12, the packer 50 in the wellbore 14 is unseated and the composition 44 is pumped through the tubing 26 into the annulus 40 between the tubing and the production casing 24. The wellbore 14 is then pressurized, as shown in FIG. 13 to force the composition through the leak 70 in the production casing 24. The packer 50 is reseated and the excess composition 44 is circulated out of the tubing 26 and lower wellbore 38 with salt water or other fluid. The well 10 is closed to permit gelation and swelling of the composition 44, as shown in FIG. 13. The well 10 is tested again to determine its ability to hold pressure.

The composition inhibits corrosion which protects all tubulars, is impermeable to water flow over time due to the unique ability of the composition to swell in the presence of an aqueous solution, does not degrade, as the strengthening agent and the swelling agent provide a durable seal. The swelling additive will continuously seal any casing leaks which may develop.

Figures 14, 15:
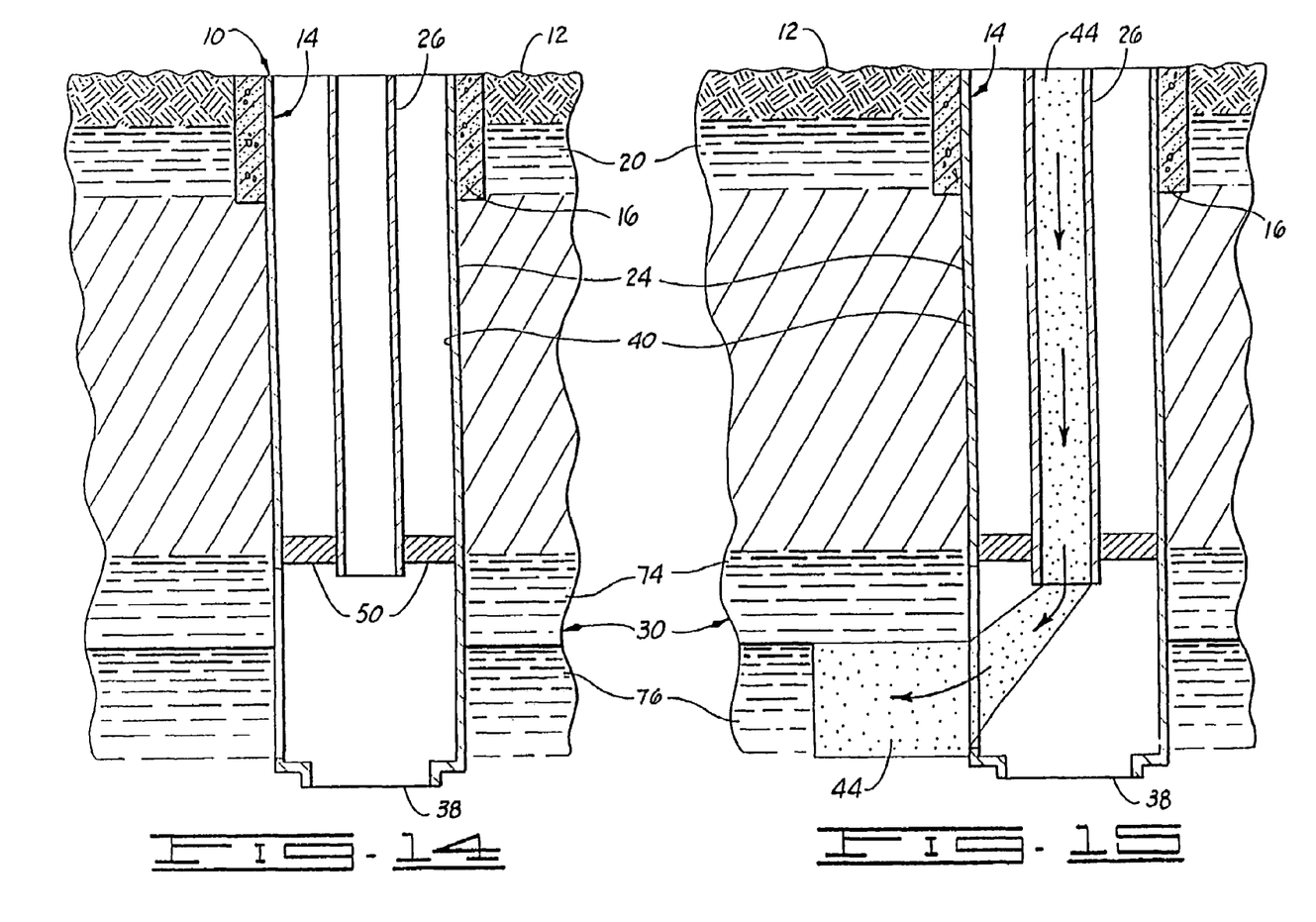
FIG. 14 is a cross sectional view of a subterranean formation having a water bearing zone.
FIG. 15 is a cross sectional view of a subterranean formation and shows introduction of the composition of the present invention into the water bearing zone of the formation.

Finally, use of the composition to reduce water production in an oil and gas well is shown in FIGS. 14 through 16. FIG. 14 shows a typical oil well 10 having a zone 30 bearing oil 74 and water 76. The water 76, being more dense than the oil, separates to the bottom of the zone 30. The water 76 is produced with the oil 74, resulting in increased operational costs. The water 74 must be disposed of by reinjecting it into a salt water disposal well at the surface 12 or by transporting it to another location. The composition of the present invention may be used to inhibit the production of the water 76, and thereby make the well 10 more profitable to operate.

As shown in FIG. 15, the composition 44 is introduced through the tubing 26 into the zone 30. Turning to FIG. 16, the tubing 26 is flushed with crude oil or other fluid to remove the composition 44 from the wellbore 14. The well 10 is closed to permit gelation and swelling of the composition 44. The composition 44 preferentially wets with the water 76 in the zone 30 and hydrates forming a semi-solid, stable gel structure.

The advantage is that the amount of water 76 produced from the zone 30 is reduced, thereby decreasing the operational costs. The method is less costly than conventional methods using cement, and will continuously seal the formation against water flow as it continues to hydrate with aqueous solutions in the environment.

The following examples illustrate the utility and the practice of the method of the present invention:

EXAMPLE 1

Two different encapsulated swelling agents, namely poly (acrylate) and poly (acrylamide), have been tested in combination with the composition of the present invention. For each swelling agent, 0.13 grams of polyacrylamide were dissolved in 25 mL of water. To this solution, 0.04 grams of sodium dichromate and 0.12 grams of sodium thiosulfate were added in solid form and dissolved at ambient conditions. The aqueous polymer solution was poured into a graduated cylinder. The solution was permitted to gel over a two day period, after which point, 0.65 grams of encapsulated crosslinked poly (acrylate) were inserted into the gel in one test and 0.65 grams of crosslinked poly(acrylamide) were inserted into the gel in other test. Twenty-five milliliters of water were added to each mixture, and the volume of each mixture was monitored over time. The following table shows the resulting data:

TABLE 1

| TIME (hours) | Volume (mL) of crosslinked Poly(acrylate) | Volume (mL) of crosslinked Poly(acrylamide) |
|---|---|---|
| 0 | 26 | 26 |
| 24 | 37 | 27 |
| 56 | 45 | 29 |
| 76 | 48 | 30 |
| 96 | 49 | 31 |
| 120 | 50 | 32 |
| 144 |  | 33 |
| 168 |  | 34 |
| 192 |  | 35 |
| 213 |  | 35 |

The polymer solution containing encapsulated crosslinked poly(acrylate) swelled to 50 mL over a 120 hour period. The polymer solution containing encapsulated crosslinked poly (acrylamide) swelled to a volume of 35 mL over 213 hours.

The delta in the volume of each gel composition as each mixture hydrated was recorded and plotted graphically versus time. The resultant coordinates may be found in FIG. 17.

Figure 17:
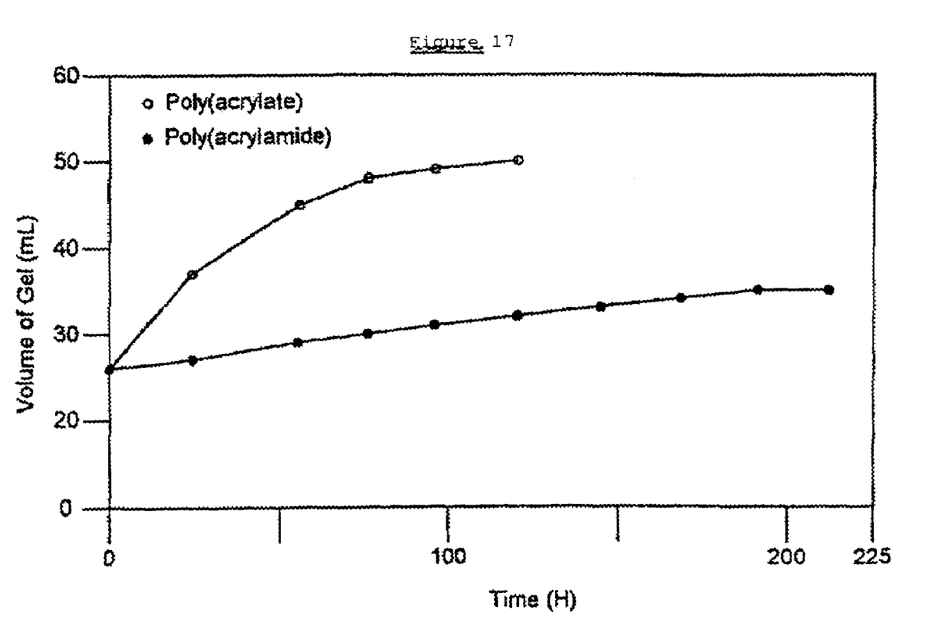
FIG. 17 is a graphic showing Volume of Gel verses Time as described in Example 1.

As shown, the relationship between volume and time of the crosslinked poly(acrylamide) encapsulated mixture is essentially linear until a maximum of 35 mL is reached. The volume of the gel-containing crosslinked poly(acrylate) encapsulated material increases rapidly, indicating a fast hydration rate of this swelling agent.

Without undue experimentation, one skilled in the art is capable of determining the amount of swelling agent to be added to the gel composition to achieve a desired swelling rate. Some of the considerations affecting the amount of swelling agent added to the mixture will be the nature of the gel composition forming the base mixture, the conditions under which hydration and the controlled release of the swelling material is to take place, and the particular application for which the composition will be used.

EXAMPLE 2

Laboratory tests were conducted to test the gel strength of differing mixes of the composition of the present invention. Various mixes of the present invention were loaded into ½ inch plastic tubing and allowed to gel over a period of four days. The tubing was then pressurized to push the gelled polymer out of the plastic tubing. The amount of pressure required to remove the gel from the tubing was recorded. The results of the laboratory tests are as follows:

TABLE 3

| COMPOSITION | PRESSURE |
|---|---|
| Mixture 1: 2.5#/bbl carboxymethylcellulose, 1200 ppm sodium dichromate, 0.5% potassium chloride | 53.33 psig |
| Mixture 2: 2.5#/bbl carboxymethylcellulose, 1200 ppm sodium dichromate, 0.5% potassium chloride, 2.5#/Bbl acrylamide potassium acrylate copolymer | 76.67 psig |
| Result: Swelling agent acrylamide potassium acrylate copolymer increased the strength of the base gel by 143%. | |

EXAMPLE 3

The gel strengths of various mixes of the composition of the present invention were then tested in actual field settings. The tubing of a 1000 foot deep well was filled from top to bottom with various identified embodiments of the gel composition of the present invention. Each embodiment was allowed to gel over a period of four days, after which period of time, the annulus of the well was pressurized to push the gelled composition from the bottom of the well tubing to the top of the well. The pressures required to move each composition through the well bore were recorded and are set forth below. Prior to testing with the various compositions, the well was pressure tested to 1500 psig. The average earth formation pressure at 1000 feet is approximately 433 psig. The results of the field test are as follows:

a. Mixtures of 100% carboxymethylcellulose were tested according to the above procedure and produced the following results:

TABLE 4

| Composition | Pressure |
|---|---|
| Mixture 1: 2.5#/bbl carboxymethylcellulose, 1200 ppm sodium dichromate, 10#/bbl diatomaceous earth | 190 psig |
| Mixture 2: 2.5#/bbl carboxymethylcellulose, 1200 ppm sodium dichromate, 10#/bbl Diatomaceous Earth, 2.5#/bbl acrylamide potassium acrylate copolymer | 600 psig |
| Result: Swelling agent acrylamide potassium acrylate copolymer increased the strength of the base gel by 315%. | | b. Mixtures of cellulose ether polymer (50%) and a polyacrylamide polymer (50%) were tested according to the above procedure and produced the following results:

TABLE 5

| Composition | Pressure |
|---|---|
| Mixture 1: 2.5#/bbl polymer, 1300 ppm sodium dichromate, 10#/bbl diatomaceous earth | 600 psig |
| Mixture 2: 2.5#/bbl polymer, 1300 ppm sodium dichromate, 10#/bbl diatomaceous earth, 2.5#/bbl acrylamide potassium acrylate copolymer | 640 psig |
| Result: Swelling agent acrylamide potassium acrylate copolymer increased the strength of the base gel by 7%. | | c. Mixtures of a cellulose ether polymer (70%) and a polyacrylamide polymer (30%) were tested according to the above procedure and produced the following results:

TABLE 6

| COMPOSITION | PRESSURE |
|---|---|
| Mixture 1: 3.5#/bbl polymer mixture, 1500 ppm sodium dichromate, 10#/bbl diatomaceous earth | 650 psig |
| Mixture 2: 3.5#/bbl polymer mixture, 1500 ppm sodium dichromate, 10#/bbl diatomaceous earth, 2.5#/bbl acrylamide potassium acrylate copolymer, 8.95#/bbl Barite | 1500+ psig |
| Result: Swelling agent acrylamide potassium acrylate copolymer and strengthening agent increased the strength of the base gel by 230%. | |

EXAMPLE 4

The Environmental Protection Agency (the "EPA") limits chromium releases to fresh water to below 5 milligrams per liter. The EPA has developed Toxicity Characteristic Leaching Procedures Extraction Methods 1311 and Detection Method 218.1. ("TCLP Tests") to estimate chromium releases. TCLP Tests were performed on various mixes of the composition of the present invention to measure the ability of the compositional mixes to inhibit chromium leaching to the environment. TCLP Tests measure the amount of toxic substance, in this case chromium, present in the mixture after a period of one week. The TCLP Tests produced the following results measured in mg of chromium per liter of mixture:

TABLE 7

| Composition | mg Cr ± L gel |
| --- | --- |
| Mixture 1: 2.5#/bbl carboxymethylcellulose, 1428.5 ppm sodium dichromate 0.5% potassium chloride | 11 mg/L |
| Mixture 2: 2.5#/bbl carboxymethylcellulose, 1428.5 ppm sodium dichromate 0.5% potassium chloride, 2.5#/bbl acrylamide potassium acrylate copolymer | 3.650 mg/L |
| Mixture 3: 2.5#/bbl cellulose ether polymer, 1428.4 ppm sodium dichromate 0.5% potassium chloride, 2.5#/bbl acrylamide potassium acrylate copolymer (medium grain) | 4.75 mg/L |
| Mixture 4: 2.5#/bbl cellulose ether polymer, 1428.5 ppm sodium dichromat 0.5% potassium chloride, 2.5#/bbl acrylamide potassium acrylate copolymer (large grain). | 4.75 mg/L |

The TCLP Tests show that the composition of the present invention is capable of inhibiting the release of toxic substances into the environment and can meet current government standards of less than 5 mg/L for chromium.

EXAMPLE 5

The capacity of the swelling agent was tested and measured in a laboratory setting. Poly(acrylamide) and Poly(acrylate) each were combined individually with polyethylene glycol and formed into spheres approximately 5/8 inches in diameter using a jaw-breaker die. The (poly)acrylamide spheres and the poly(acrylate) sphere were each inserted into the composition of the present invention, held in a one pint volume container, immediately prior to gelation. The spheres in each mixture swelled from 5/8 inches to at least 3 inches over a period of 24 to 48 hours with no apparent gel degradation. The spheres may have swollen to an even larger diameter, were it not for the limitations imposed by the size of the test containers.

It will now be appreciated that the composition of the present invention comprises an environmentally safe, stable, water impermeable gel resistant to extrusion which inhibits leaching of toxins and is useful in a variety of applications. The composition can be used in the construction industry to line a basement between the concrete form and the earth to prevent the entrance of water. In addition, the composition may be used to line an underground storage tank to eliminate hydrocarbon seepage into the environment.

It further will be appreciated that the forgoing describes preferable methods of use of the composition and that changes in the methods practiced are within the scope of the invention. Changes may be made in the various parts, elements, steps, and procedures described herein without departing from the spirit and scope of the invention as defined in the following claims.

We claim:

1. A method for removably plugging a wellbore of an oil or gas well to be abandoned, wherein the well defines the wellbore and wherein the method comprises the step of forming a plug within the wellbore, the plug being removable from the wellbore by circulating fluid through the wellbore, in which the plug comprises:
   a gel structure comprising at least one crosslinked polymer; and
   a swelling agent receptive to substantial hydration, wherein the swelling agent is crosslinked acrylamide sodium acrylate copolymer.

2. The method of claim 1 in which the plug is removable by circulation of a fluid selected from the group consisting of water, drilling mud and oil.

3. The method of claim 2 in which the fluid further comprises:
   an oxidizing agent.

4. The method of claim 1 in which the plug is removable by circulation of a fluid having an oxidizing agent therein.

5. The method of claim 1 in which the polymer is selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of pyrrolidone, acrylamide and sodium 2-acrylamido-2-methylpropane sulfonate, copolymers of acrylamide and sodium 2-acrylamido-2-methylpropane sulfonate, water soluble cellulose ether, and mixtures thereof.

6. The method of claim 1 wherein the polymer comprises a mixture of polymers, the mixture comprising:
   carboxymethylcellulose having from about a 0.65 to about a 0.95 degree of substitution; and
   partially hydrolyzed polyacrylamide having a degree of hydrolysis ranging from about 10 to about 20 percent.

7. The method of claim 1 in which the swelling agent is selected from the group consisting of: homopolymers and copolymers of one or more monomers selected from a group consisting of ethylene oxide, vinyl alcohol, acrylic acid, acrylamide, acrylonitrile, N-vinyl pyrrolidone, 2-hydroxyethylmethacrylate, N-alkylacrylamide, N,N-dialkylacrylamide, mono-N-alkylitconates, gamma-glutamic acid, and L-glutamic acid; and mixtures and gel blends of such homopolymers and copolymers.

8. The method of claim 1 wherein the swelling agent is selected from the group consisting of chitosan, pectin, gelatin, amylopectin, k-carrageeman, hyaluronic acid, sulphobetaine, cellulose ethers, starch and mixtures thereof.

9. The method of claim 1 in which the swelling agent is at least partially enclosed in an encapsulation material and wherein the encapsulation material is characterized by the ability to delay the swelling process.

10. The method of claim 9 in which the swelling agent is a synthetic polymer taken from the group consisting of glycolide, poly(acrylate)s, poly(alkyl α-cyanoacrylate) and poly(acrylamide).

11. The method of claim 9 in which the encapsulation material comprises a natural polymer selected from the group consisting of starch derivatives, cellulose derivatives, polysaccharrides, chitosan, gelatin and carrageenans.

* * * * *